(12) United States Patent
Andrews et al.

(10) Patent No.: US 7,509,251 B2
(45) Date of Patent: Mar. 24, 2009

(54) MOCK TRANSLATING SOFTWARE APPLICATIONS AT RUNTIME

(75) Inventors: James Neal Andrews, Austin, TX (US); David Bruce Kumhyr, Austin, TX (US); Joseph C. Ross, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 1187 days.

(21) Appl. No.: 10/328,353

(22) Filed: Dec. 23, 2002

(65) Prior Publication Data

US 2004/0122652 A1   Jun. 24, 2004

(51) Int. Cl.
*G06F 17/28* (2006.01)
(52) U.S. Cl. .............................. 704/8; 704/2
(58) Field of Classification Search ............ 704/2–8; 715/531, 262–264
See application file for complete search history.

(56) References Cited

U.S. PATENT DOCUMENTS

| | | | | |
|---|---|---|---|---|
| 5,201,042 | A * | 4/1993 | Weisner et al. ................. | 704/8 |
| 5,243,519 | A * | 9/1993 | Andrews et al. ............... | 704/8 |
| 5,416,903 | A * | 5/1995 | Malcolm .................... | 715/703 |
| 5,513,342 | A * | 4/1996 | Leong et al. ................ | 715/798 |
| 5,671,378 | A * | 9/1997 | Acker et al. ................ | 715/801 |
| 5,828,992 | A * | 10/1998 | Kusmierczyk ................. | 704/8 |
| 6,311,151 | B1 * | 10/2001 | Yamamoto et al. ............. | 704/8 |
| 6,345,244 | B1 * | 2/2002 | Clark ............................ | 704/2 |
| 6,425,123 | B1 | 7/2002 | Rojas et al. .................. | 717/136 |
| 6,453,462 | B1 | 9/2002 | Meade et al. ................ | 717/124 |
| 6,526,426 | B1 * | 2/2003 | Lakritz ........................ | 715/536 |
| 6,938,259 | B2 * | 8/2005 | McGeorge, Jr. ............. | 719/313 |
| 2002/0077807 | A1 * | 6/2002 | Davis et al. .................... | 704/8 |
| 2003/0004703 | A1 * | 1/2003 | Prabhakar et al. ............. | 704/8 |

OTHER PUBLICATIONS

Vartan Piroumian, Internationalization Support in Java, IEEE Micro, vol. 17, Issue 3 1997, p. 20-29.*
Henke, Facilitating Translation of Technical Information for the International Market, 1990, IEEE, p. 90-94.*

* cited by examiner

*Primary Examiner*—Patrick N. Edouard
*Assistant Examiner*—Lamont Spooner
(74) *Attorney, Agent, or Firm*—Yee & Associates, P.C.; Justin Dillon

(57) ABSTRACT

A method, computer program product, and data processing system for mock-translating the text messages used in a software application at runtime is disclosed. A text message in a first human language are read from a resource bundle at runtime. A textual representation of the text message having features of a second human language is then derived from the original text message and displayed in the application in place of the original text message. This textual representation may contain such features of the second human language as the character set and average length of words. The displayed textual representation can then be used to determine whether modifications to the application code need be made in order to support the second human language.

26 Claims, 3 Drawing Sheets

MOCK TRANSLATING SOFTWARE APPLICATIONS AT RUNTIME

CROSS-REFERENCE TO RELATED APPLICATIONS

The present application is related to U.S. Pat. No. 6,453,462 to Meade et al., entitled "MOCK TRANSLATION SYSTEM, METHOD, AND PROGRAM USING MULTI-BYTE PLACEHOLDER CHARACTERS TO TEST TRANSLATABILITY OF SOFTWARE THAT WILL DISPLAY MULTI-BYTE LANGUAGES," which is hereby incorporated by reference.

BACKGROUND OF THE INVENTION

1. Technical Field

The present invention relates generally to tools for internationalization of software. More particularly, the present invention relates to an improved method, apparatus, and computer program for assessing the capability of an application to handle different languages and character sets.

2. Description of Related Art

JAVA, a trademark of Sun Microsystems, Inc., is an object-oriented, compiled, multi-threaded computer language that generates platform-independent executable files.

JAVA is object-oriented. This means, in the simplest terms, that it allows for the association of member functions or "methods" within data structures. Indeed, all JAVA programs are made up solely of data structure types known as "classes," where classes contain both data fields and methods.

Classes may "inherit" characteristics of other classes. When a "descendant" class inherits from another "ancestral" class, it inherits all of the data fields and methods of the ancestral class. In addition, a descendent class may provide its own methods to supplement or take the place of ancestral class methods.

JAVA is compiled. That means that before a JAVA program (written as source code) can be executed, it must be processed by a compiler to make an executable form of the program. Executable JAVA programs are stored in ".class" files, with each ".class" file containing executable object code for a single JAVA class.

JAVA is multi-threaded. This means that a single JAVA program can have several sequences of code executing concurrently. Each of these sequences is known as a thread. Multi-threaded program languages, such as JAVA, are very useful when writing software such as, for instance, communication software, where it is helpful to allow the software to perform other tasks while waiting for input.

JAVA produces platform-independent executables. When a JAVA program is compiled to produce ".class" files, those ".class" files are capable of being executed on any platform having a JAVA runtime environment. A JAVA runtime environment is a piece of software that allows a computer to executes JAVA ".class" files. JAVA runtime environments are available for many, if not most, commonly used computer platforms today.

There are essentially two kinds of JAVA runtime environments: interpreters and just-in-time compilers. Interpreters directly interpret the binary code contained in ".class" files and execute instructions corresponding to that binary code as the interpretation process is carried out. Just-in-time compilers, on the other hand, first translate the binary code into native instructions, then execute the native instructions. Native instructions are instructions that are designed to be executed directly by the computer's hardware.

JAVA's "write once, run anywhere" philosophy extends not only into the realm of platform independence, but also to that of software internationalization, where a principle of "write once, run anywhere in the world" applies. JAVA was among the first computer language standards to embrace Unicode, a sixteen-bit character set standard that includes not only the twenty-six letters of modern English, but a variety of characters and accented characters used in other languages. The sixteen-bit standard allows a sufficient range of characters (65,536) not only for the inclusion of multiple alphabets, such as Cyrillic and Hebrew, but also for the character sets of languages such as Chinese and Japanese. Chinese does not use an alphabet but relies on the use of thousands of different ideograms; Japanese uses two alphabets in addition to a set of approximately two thousand ideograms.

JAVA also provides a facility for internationalization known as "Resource Bundles." Resource bundles are files that store the text messages displayed by a JAVA program. When a JAVA program uses resource bundles, it loads its text messages from the resource bundle to be displayed to a user.

By separating text messages from the program code that displays them, it becomes easier to generate versions of a program that display in different languages. To make a German translation of an English original to a program, for instance, one need only create a German resource bundle to be interchanged with the English one. Thus, keeping to JAVA's "write once, run anywhere" philosophy, the JAVA program code need only be written and compiled once.

Even though resource bundles allow code development to be performed independently of text translation, some aspects of code development are nonetheless still dependent on which human language(s) the finished product will utilize. For example, different languages use different character sets or may require different amounts of space on the screen (for example, a few of Chinese characters may represent a twenty-letter word in German). In order to fully separate the development process into separate code development and human language translation processes, code developers need some way of testing the capabilities of their software to handle various human languages without requiring actual translations of the text to be used.

U.S. Pat. No. 6,453,462 to Meade et al., incorporated herein by reference, describes the use of mock translation whereby text in a first human language is replaced with text that is modified to simulate a second human language. In the Meade patent, localization files are used to store the text displayed by the program. The translatability of the text used with a particular program is tested by using a localization file containing a "mock translation" of the original text.

The method of using mock-translated text as described in the Meade patent requires that new mock-translated localization files be generated, however. This requires that a separate mock-translating program be executed to generate new mock-translated localization files each time the original localization files change, which is somewhat tedious. What is needed, then, is a mock-translation system that does not require generation and regeneration of mock-translation files.

SUMMARY OF THE INVENTION

The present invention provides a method, computer program product, and data processing system for mock-translating the text messages used in a software application at runtime. A text message in a first human language are read from a resource bundle at runtime. A textual representation of the text message having features of a second human language is then derived from the original text message and displayed in the application in place of the original text message. This textual representation may contain such features of the second human language as the character set and average length of words. The displayed textual representation can then be used to determine whether modifications to the application code need be made in order to support the second human language.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
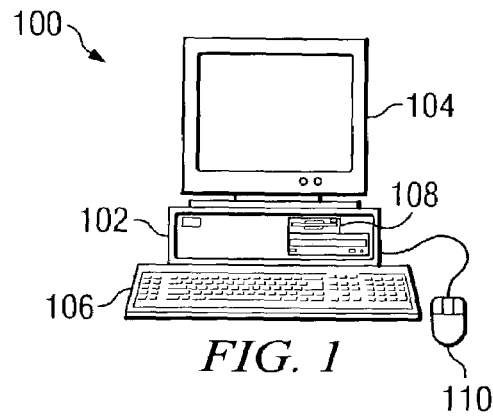
FIG. 1 is a diagram providing an external view of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
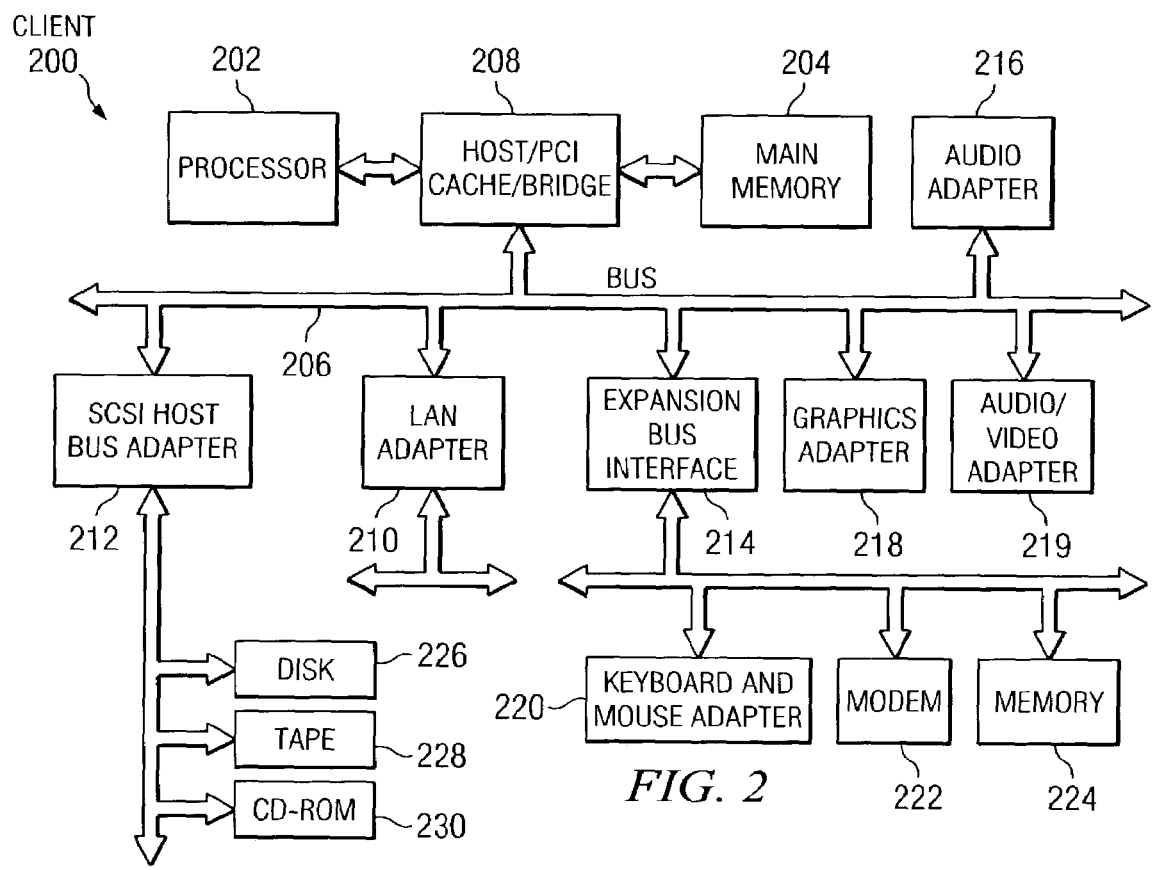
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention is directed toward a method, computer program product, and data processing system for mock-translating the text messages used in a software application at runtime. A preferred embodiment of the present invention utilizes the resource bundle facility of the object-oriented JAVA programming language. It should be noted that the term "resource bundle" appears in various locations in this document. While the term "resource bundle," as used herein, is intended to include JAVA resource bundles, the term is intended to have broad scope and encompass other forms of storage of textual elements, such as localization files, text databases, resource files, and the like. Also, it should be noted that the term "application" is used loosely in this document to mean any type of computer program, including applets, operating systems, desktop applications, text-based applications, and the like.

Figure 3A:
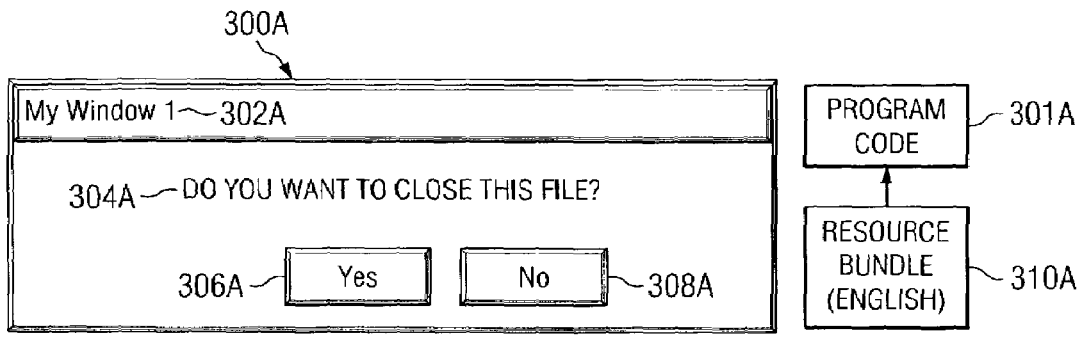
FIG. 3A is a diagram depicting the relationships of a graphical user interface, a resource bundle, and program code in accordance with an embodiment of the present invention.

FIG. 3A is a diagram depicting how language-specific information is separated from an executable program using JAVA resource bundles in accordance with a preferred embodiment of the present invention. Window 300A is displayed to a user as part of a graphical user interface when executable program code 301A is executed. Window 300A contains several textual and graphical features, including window title 302A, label 304A, and buttons 306A and 308A. The text contained in these features is stored in resource bundle 310A separately from program code 301A. When program code 301A displays window 300A, it loads the text for features 302A, 304A, 306A, and 308A from resource bundle 310A.

Figure 3B:
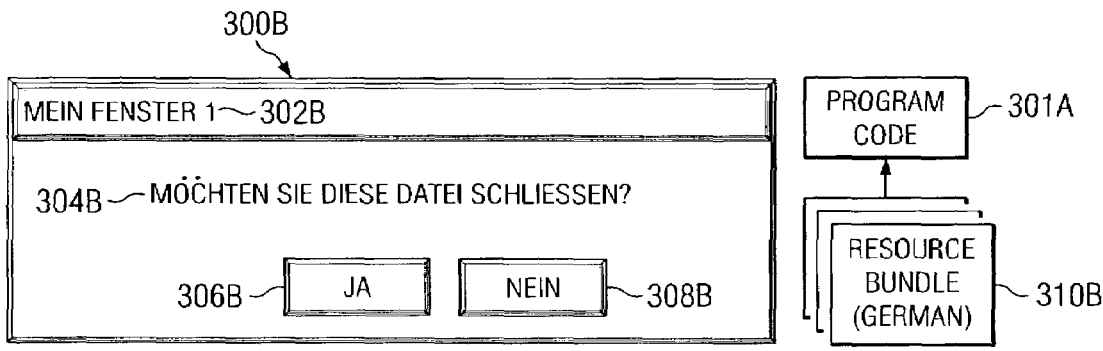
FIG. 3B is a diagram demonstrating how a translation of software may be made by interchanging resource bundles in accordance with an embodiment of the present invention.

As FIG. 3A illustrates, separating executable program code 301A from resource bundle 310A makes it easy to produce new versions of the program to run in different languages. While window 300A in FIG. 3A was in English, window 300B in FIG. 3B is in German. Features 302B, 304B, 306B, and 308B, while rendered similarly to features 302A, 304A, 306A, and 308A of FIG. 3A, have equivalent German text substituted for the English. The German text is stored in resource bundle 310B, which is loaded by executable program code 301A, the identical program code as in FIG. 3A. Resource bundle 310B is thus both separate from program code 301A and interchangeable with other resource bundles produced to be used by program code 301A. Translation of a piece of software from one language to another merely requires that a translator prepare a new resource bundle for the new language.

Figure 4A:
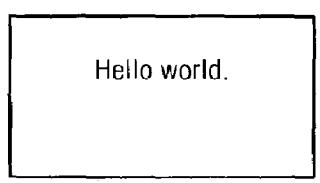
FIGS. 4A-4C are diagrams of screenshots depicting mock translation of an English source text.
Figure 4B:
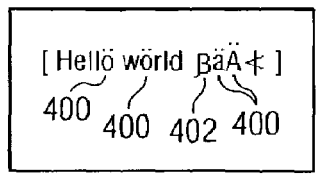
Figure 4C:
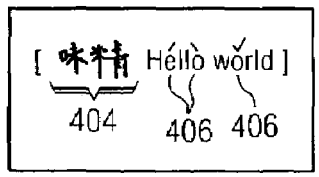

A preferred embodiment of the present invention applies mock translation to text in a resource bundle at runtime to achieve a textual representation of the original text, where the textual representation has features of a human language other than the one the original text is written in. This textual representation may contain such features of the second human language as the character set and average length of words. FIGS. 4A-4C illustrate the mock translation concept.

FIG. 4A is a screenshot of the output of a simple program for displaying a familiar greeting, namely "Hello world." FIG. 4A represents text that has not been mock translated (i.e., the original text for the examples in FIGS. 4A-4C). FIG. 4B is a screenshot of a German mock translation of the "Hello world" text from FIG. 4A. The text has been lengthened to account for longer possible word lengths and several characters 400 are reproduced with umlauts to test the character set needed for displaying German. In addition, "β" symbol 402, which is a character that is specific to German, is also displayed in the mock translation, in order to test the character set. Note that the original English text is still discernable in FIG. 4B, even though this mock translation is designed to test features of the German language. FIG. 4C is an additional example screenshot of a mock translation. FIG. 4C is a Chinese mock translation of "Hello world." In this case, some of the text has been replaced with Chinese characters 404. The message has also been lengthened and some of the letters in "Hello world" have been modified to include the marks typically used to indicate the tone of Chinese words when written in the standard "pin-yin" Romanization system, which is used to transcribe spoken Mandarin Chinese into Latin characters. The mock translation in FIG. 4C will likely be encoded in two-byte characters in a character set such as Unicode to accommodate the inclusion of Chinese characters (which are too numerous to be represented by a single byte). Further details regarding mock translation may be found in the text of incorporated U.S. Pat. No. 6,453,462.

As stated previously, the present invention is directed toward performing mock translation at runtime. Text is loaded from a resource bundle at runtime by the application being tested, converted into a mock-translated form for the particular language being tested, and displayed. A preferred embodiment of the present invention accomplishes runtime mock translation by modifying the JAVA Resource Bundle infrastructure used by the application to perform mock translation at runtime.

To understand how this takes place, it is helpful to consider the normal operation of an application that makes use of resource bundles. The example provided in FIG. 5 is specifically tailored to address an embodiment in which JAVA Resource Bundles are utilized, but one of ordinary skill in the art will recognize that the fundamental teachings provided in the following figures may be applied in programming contexts other than the JAVA language.

Figure 5:
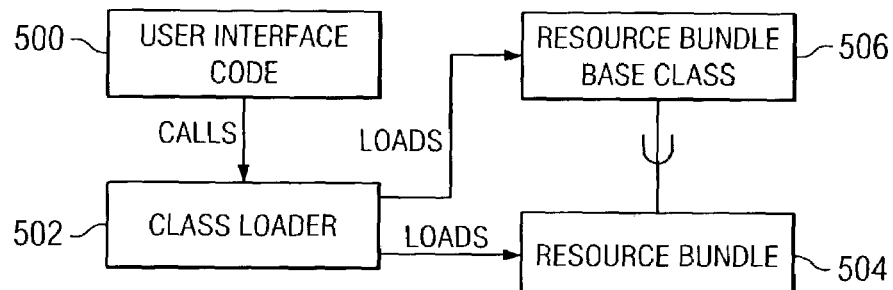
FIG. 5 is a diagram depicting the use of a resource bundle in a software application as known in the art.

Turning now to FIG. 5, user interface code 500 represents a portion of an application that provides a user interface. User interface code 500 displays text taken from resource bundles such as resource bundle 504. In the example provided in FIG. 5, resource bundle 504 is actually a JAVA class that is a descendent of a parent resource bundle class 506, which is part of the JAVA language. Resource bundle 504 is used by user interface 500 by first being loaded into the JAVA runtime environment along with its parent class 506. This loading is performed by a JAVA class loader 502 (called "java.lang.ClassLoader"). When resource bundle 504 is needed, it is loaded by class loader 502 and its parent class 506 is also loaded by class loader 502 to enable the methods in parent class 506 to be used by and in conjunction with resource bundle 504. Parent class 506 provides the external interface for accessing the contents of resource bundle 504. That is, resource bundle 504 is accessed by executing methods that are defined by parent class 506.

Figure 6:
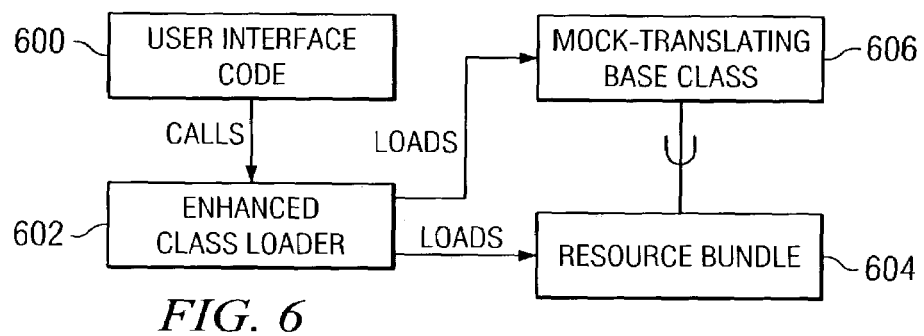
FIG. 6 is a diagram depicting the use of a resource bundle in conjunction with mock translation in accordance with a preferred embodiment of the present invention.

FIG. 6 is a diagram of the components used in runtime mock translation in accordance with a preferred embodiment of the present invention. User interface code 600 uses an enhanced class loader 602 to load resource bundle 604. Enhanced class loader 602 is enhanced to enable the loading of alternative resource bundle base classes at runtime. Enhanced class loader 602 simply overrides or takes the place of the conventional class loader java.lang.ClassLoader. Enhanced class loader 602 is designed to allow a mock-translating base class 606 to be loaded in conjunction with resource bundle 604 to allow runtime mock translation. This can be done by simply substituting mock-translating base class 606 for java.lang.ClassLoader in the JAVA runtime library. Enhanced class loader 602 may also be designed so that a mock-translating base class such as base class 606 can be activated (e.g., via special key sequence) at runtime and also deactivated as needed. Mock-translating base class 606 is given the same name as the original "straight" base class, so that resource bundle will use mock-translating base class 606's routines as its base class. Thus, instead of (more or less) directly accessing resource bundle 604, as in the previous example in FIG. 5, when user interface code 600 needs text, the text is first mock translated by mock-translating base class 606 before being displayed.

Figure 7:
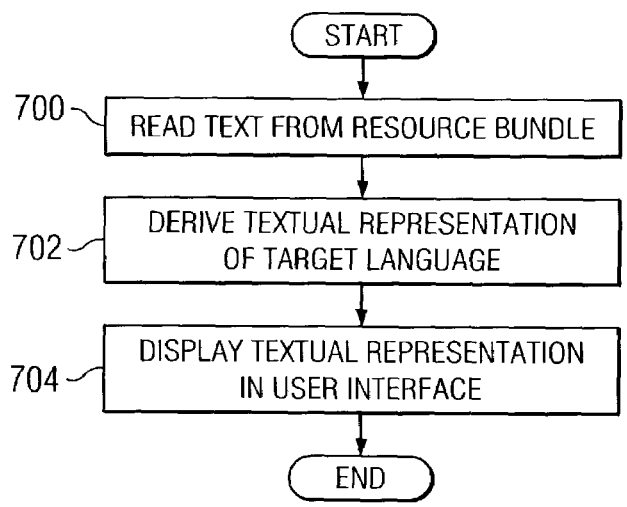
FIG. 7 is a flowchart representation of a process of mock translating text at runtime in accordance with a preferred embodiment of the present invention.

FIG. 7 is a flowchart representation of a basic process of runtime mock translation in accordance with a preferred embodiment of the present invention. Original text in a first human language is read from a resource bundle (block 700). A textual representation containing features of a target language is derived from the original text by the application (block 702). Finally, the textual representation is displayed within the application's user interface (block 704).

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data-processing system-based method comprising:
    reading translatable text in a first human language from a resource bundle;
    dynamically replacing the translatable text with a mock translation comprising a textual representation of the translatable text, wherein said textual representation contains text in a second human language combined with at least one textual support feature of the second human language, and said textual representation further contains text in the first human language, and wherein the at least one feature of the second human language includes the average length of words of the second human language; and
    displaying said textual representation that replaces the translatable text.

2. The method of claim 1, wherein the method further comprises determining whether modifications need to be made to associated application code, in order to support the second human language.

3. The method of claim 1, wherein the at least one feature of the second human language includes a character set associated with the second human language.

4. The method of claim 3, wherein the character set is a multiple-byte character set.

5. The method of claim 3, wherein the textual representation contains characters from the character set associated with the second human language that are not associated with the first human language.

6. The method of claim 1, wherein the translatable text is replaced with the textual representation in response to a user input event.

7. The method of claim 1, wherein the resource bundle is a descendent class of a named resource bundle class having a name, and wherein replacing the translatable text with the textual representation is performed by executing code in a mock-translating resource bundle class having the name of the named resource bundle class.

8. The method of claim 7, wherein the mock-translating resource bundle class shares a name with a default resource bundle class, the method further comprising:
    loading, with a class loader, a mock-translating resource bundle class rather than the default resource bundle class as a parent class for the resource bundle.

9. A computer program product in a computer-readable recordable-type medium comprising functional descriptive material that, when executed by a computer, enables the computer to perform acts including:
    reading translatable text in a first human language from a resource bundle;
    dynamically replacing the translatable text with a mock translation comprising a textual representation of the translatable text, wherein said textual representation contains text in a second human language combined with at least one textual support feature of the second human language, and and wherein the at least one feature of the second human language includes the average length of words of the second human language said textual representation further contains text in the first human language; and
    displaying said textual representation that replaces the translatable text.

10. The computer program product of claim 9, wherein the at least one feature of the second human language includes a predicted text length.

11. The computer program product of claim 9, wherein the at least one feature of the second human language includes a character set associated with the second human language.

12. The computer program product of claim 11, wherein the character set is a multiple-byte character set.

13. The computer program product of claim 11, wherein the textual representation contains characters from the character set associated with the second human language that are not associated with the first human language.

14. The computer program product of claim 9, wherein the textual representation contains text in the first human language.

15. The computer program product of claim 9, wherein the translatable text is replaced with the textual representation in response to a user input event.

16. The computer program product of claim 9, wherein the resource bundle is a descendent class of a named resource bundle class having a name, and wherein replacing the translatable text with the textual representation is performed by executing code in a mock-translating resource bundle class having the name of the named resource bundle class.

17. The computer program product of claim 16, wherein the mock-translating resource bundle class shares a name with a default resource bundle class, the method further comprising:
    loading, with a class loader, a mock-translating resource bundle class rather than the default resource bundle class as a parent class for the resource bundle.

18. A data-processing system-based data processing system comprising:
    means for reading translatable text in a first human language from a resource bundle;
    means for dynamically replacing the translatable text with a mock translation comprising a textual representation of the translatable text, wherein said textual representation contains text in a second human language combined with at least one textual support feature of the second human language, and wherein the at least one feature of the second human language includes the average length of words of the second human language said textual representation further contains text in the first human language; and
    means for displaying said textual representation that replaces the translatable text.

19. The data processing system of claim 18, wherein the at least one feature of the second human language includes a predicted text length.

20. The data processing system of claim 18, wherein the at least one feature of the second human language includes a character set associated with the second human language.

21. The data processing system of claim 20, wherein the character set is a multiple-byte character set.

22. The data processing system of claim 20, wherein the textual representation contains characters from the character set associated with the second human language that are not associated with the first human language.

23. The data processing system of claim 18, wherein the textual representation contains text in the first human language.

24. The data processing system of claim 18, wherein the translatable text is replaced with the textual representation in response to a user input event.

25. The data processing system of claim 18, wherein the resource bundle is a descendent class of a named resource bundle class having a name, and wherein replacing the translatable text with the textual representation is performed by executing code in a mock-translating resource bundle class having the name of the named resource bundle class.

26. The data processing system of claim 25, wherein the mock-translating resource bundle class shares a name with a default resource bundle class, the method further comprising:
    loading, with a class loader, a mock-translating resource bundle class rather than the default resource bundle class as a parent class for the resource bundle.

* * * * *